US010508445B2

(12) United States Patent
Voellmecke, III et al.

(10) Patent No.: US 10,508,445 B2
(45) Date of Patent: Dec. 17, 2019

(54) HOUSING APPARATUS FOR INSTALLATION OF CEILING OR WALL-MOUNTED ELECTRICAL APPLIANCES

(71) Applicants: Carl H Voellmecke, III, Clemson, SC (US); Carl H Voellmecke, IV, Columbus, OH (US)

(72) Inventors: Carl H Voellmecke, III, Clemson, SC (US); Carl H Voellmecke, IV, Columbus, OH (US)

(*) Notice: Subject to any disclaimer, the term of this patent is extended or adjusted under 35 U.S.C. 154(b) by 384 days.

(21) Appl. No.: 15/345,352

(22) Filed: Nov. 7, 2016

(65) Prior Publication Data

US 2018/0127977 A1 May 10, 2018

(51) Int. Cl.
*E04B 9/00* (2006.01)
*F24F 13/20* (2006.01)
(Continued)

(52) U.S. Cl.
CPC .............. *E04B 9/006* (2013.01); *F24F 7/007* (2013.01); *F24F 7/10* (2013.01); *F24F 13/084* (2013.01); *F24F 13/20* (2013.01); *H02G 3/123* (2013.01); *H02G 3/20* (2013.01); *F21V 21/04* (2013.01); *F21V 21/041* (2013.01); *F21V 21/044* (2013.01); *F21V 21/047* (2013.01);
(Continued)

(58) Field of Classification Search
CPC ........ F24F 7/10; F24F 13/084; F24F 2221/14; F21V 21/04; F21V 21/041; F21V 21/044; F21V 21/047; E04B 9/006
See application file for complete search history.

(56) References Cited

U.S. PATENT DOCUMENTS 1,564,365 A * 12/1925 Newnham ............. F24F 13/084
126/319
2,722,170 A * 11/1955 Broberg ................. F24F 13/00
454/332
(Continued)

FOREIGN PATENT DOCUMENTS

DE 29501523 U1 * 3/1995 ............. F21V 21/04
DE 29714402 U1 * 11/1997 ............. B60H 1/262
(Continued)

*Primary Examiner* — Eret C McNichols
(74) *Attorney, Agent, or Firm* — Southeast IP Group, LLC; Thomas L. Moses

(57) ABSTRACT

A preferably prefabricated and generally rigid recessed housing that may be inserted into a ceiling, wall, or floor to facilitate installation of various electrically powered apparatuses such as ceiling fans, exhaust fans, lighting fixtures, speakers, etc. is provided. Combining the various electrically powered apparatuses with the various embodiments of the prefabricated recessed housing provides additional advantages that include: the creation of a work space large enough for a person to install, from inside the room, a variety of electrically powered apparatuses. The housing may be designed in various shapes, and the generalized construction of the recessed housing comprises a top surface, side walls, and a bottom that is open but that may feature a full perimeter close out lip that extends beyond the side walls. The housing may further include a plurality of securing flanges for engaging bendable securing fins that may be present on the housing apparatus.

8 Claims, 10 Drawing Sheets

(51) Int. Cl.
   *F24F 7/007*    (2006.01)
   *H02G 3/20*     (2006.01)
   *H02G 3/12*     (2006.01)
   *F24F 7/10*     (2006.01)
   *F24F 13/08*    (2006.01)
   *F21V 21/04*    (2006.01)

(52) U.S. Cl.
   CPC ..... *F24F 2013/205* (2013.01); *F24F 2221/14* (2013.01); *F24F 2221/17* (2013.01)

(56) References Cited

U.S. PATENT DOCUMENTS

| | | | |
|---|---|---|---|
| 2,806,726 A * | 9/1957 | Broberg | E04F 19/08 16/73 |
| 3,130,949 A * | 4/1964 | Wolff | E04B 9/006 248/343 |
| 3,236,171 A * | 2/1966 | Vaskov | F24F 13/075 220/315 |
| 4,406,216 A | 9/1983 | Hott et al. | |
| 4,408,262 A | 10/1983 | Kusmer | |
| 4,488,391 A * | 12/1984 | Pavnica | E06B 1/02 52/211 |
| 4,550,648 A * | 11/1985 | Eagle | F24F 13/08 454/260 |
| 4,673,149 A | 6/1987 | Grote et al. | |
| 4,713,916 A * | 12/1987 | Brooks, Jr. | F21V 21/04 362/147 |
| 4,729,074 A | 3/1988 | Steadman | |
| 4,778,134 A | 10/1988 | Struthers et al. | |
| 5,400,412 A | 3/1995 | King, Sr. et al. | |
| 5,596,852 A * | 1/1997 | Schiedegger | E06B 1/006 52/198 |
| 5,716,270 A * | 2/1998 | Chambers | F24F 13/08 454/309 |
| 5,729,935 A * | 3/1998 | Schiedegger | F24F 13/08 454/277 |
| 5,928,078 A * | 7/1999 | Moore | F24F 13/068 285/341 |
| 6,578,808 B1 | 6/2003 | Bertagni et al. | |
| 6,652,375 B2 * | 11/2003 | Donnelly | F24F 13/072 454/289 |
| 6,838,618 B2 | 1/2005 | Newbold et al. | |
| 6,979,169 B2 | 12/2005 | Penlesky et al. | |
| 7,540,460 B2 | 6/2009 | Orth et al. | |
| 7,566,263 B2 * | 7/2009 | Snyder | E04F 17/04 454/284 |
| 7,610,726 B2 * | 11/2009 | Lajewski | F24F 7/00 248/220.21 |
| 7,645,189 B2 * | 1/2010 | Pilger | F24F 13/02 248/57 |
| 7,896,529 B2 * | 3/2011 | Wronski | F21S 8/02 362/365 |
| 7,946,545 B2 * | 5/2011 | Nurenberg | F24F 13/078 248/222.41 |
| 8,231,022 B2 | 7/2012 | Goldenne et al. | |
| 8,465,182 B1 | 6/2013 | Davis et al. | |
| 8,650,833 B1 * | 2/2014 | Polston | F24F 13/084 454/250 |
| 8,740,402 B2 * | 6/2014 | Chow | F21S 8/02 362/147 |
| 9,574,788 B2 * | 2/2017 | Norbury, Jr. | B60H 1/3428 |
| 2001/0025717 A1 * | 10/2001 | Schiedegger | H02G 3/123 174/58 |
| 2005/0055920 A1 * | 3/2005 | Lajewski | F24F 13/084 52/302.1 |
| 2006/0262521 A1 * | 11/2006 | Piepgras | E04B 9/006 362/149 |
| 2006/0278775 A1 * | 12/2006 | Allen | E04F 17/04 248/176.1 |
| 2007/0040091 A1 | 2/2007 | Penlesky et al. | |
| 2008/0078137 A1 * | 4/2008 | Bush | E04B 9/006 52/523 |
| 2009/0273938 A1 * | 11/2009 | Wronski | F21S 8/02 362/346 |
| 2010/0020551 A1 | 1/2010 | Kay et al. | |
| 2010/0238670 A1 | 9/2010 | Moench | |
| 2012/0262921 A1 * | 10/2012 | Boomgaarden | F21S 8/026 362/249.02 |
| 2013/0128575 A1 | 5/2013 | Zakula et al. | |
| 2016/0360656 A1 * | 12/2016 | Larsson | E04B 2/00 |
| 2018/0279026 A1 * | 9/2018 | Chappell | H04R 1/023 |
| 2018/0313524 A1 * | 11/2018 | Vidal | F21V 21/04 |
| 2018/0372283 A1 * | 12/2018 | Zeng | F21S 8/026 |

FOREIGN PATENT DOCUMENTS

| | | | | |
|---|---|---|---|---|
| EP | 2177842 | A1 * | 4/2010 | ............ F24F 13/084 |
| EP | 3118523 | A1 * | 1/2017 | ............ F23L 13/00 |
| FR | 1472521 | A * | 3/1967 | ............ E06B 7/02 |
| GB | 2324396 | A * | 10/1998 | ............ B07C 1/00 |

* cited by examiner

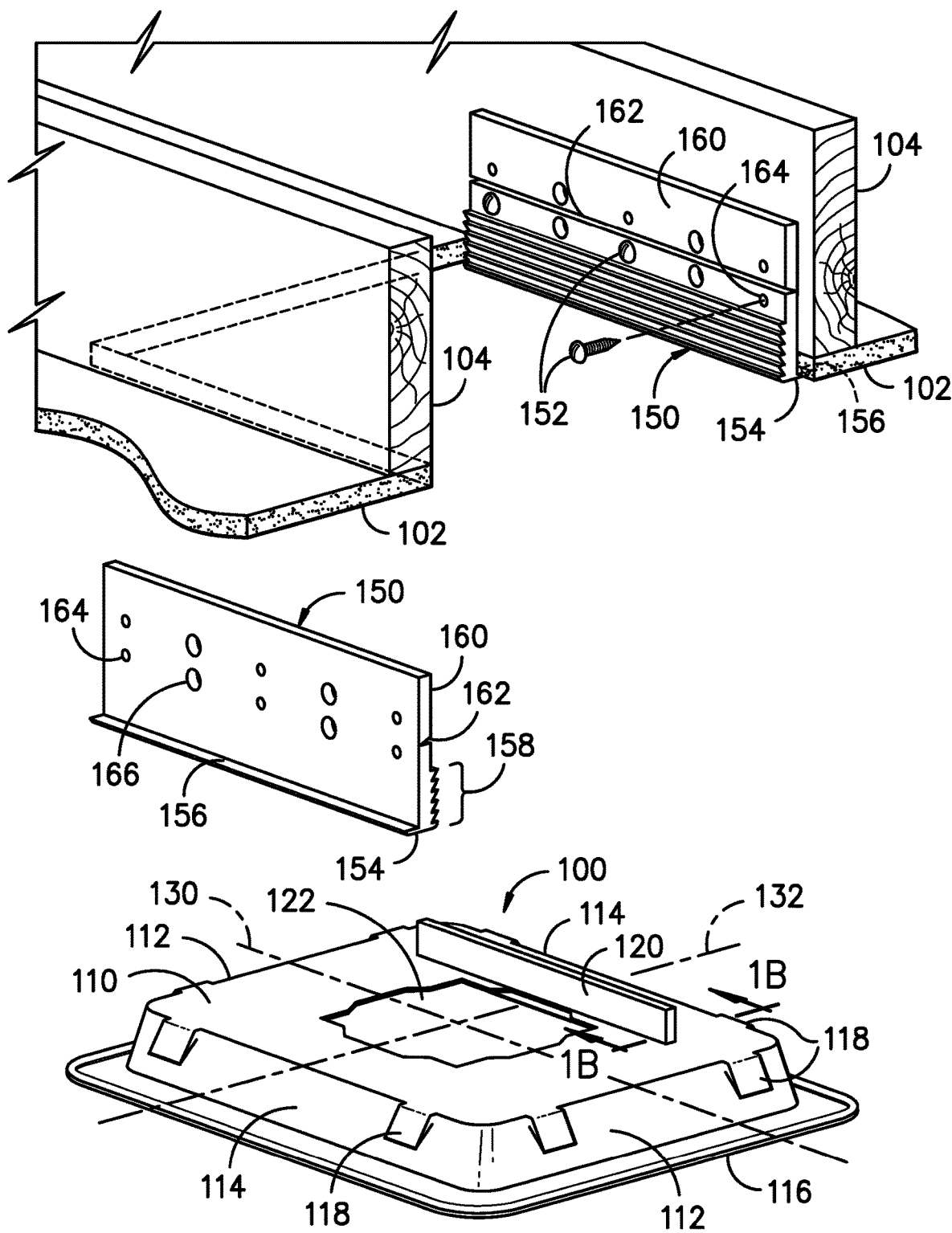
FIG. -1A-

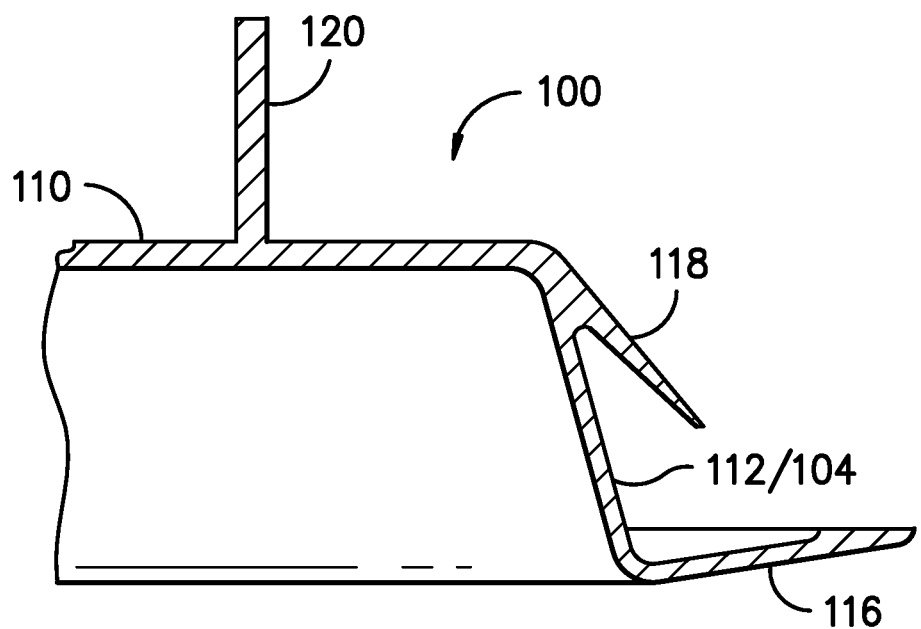
FIG. -1B-

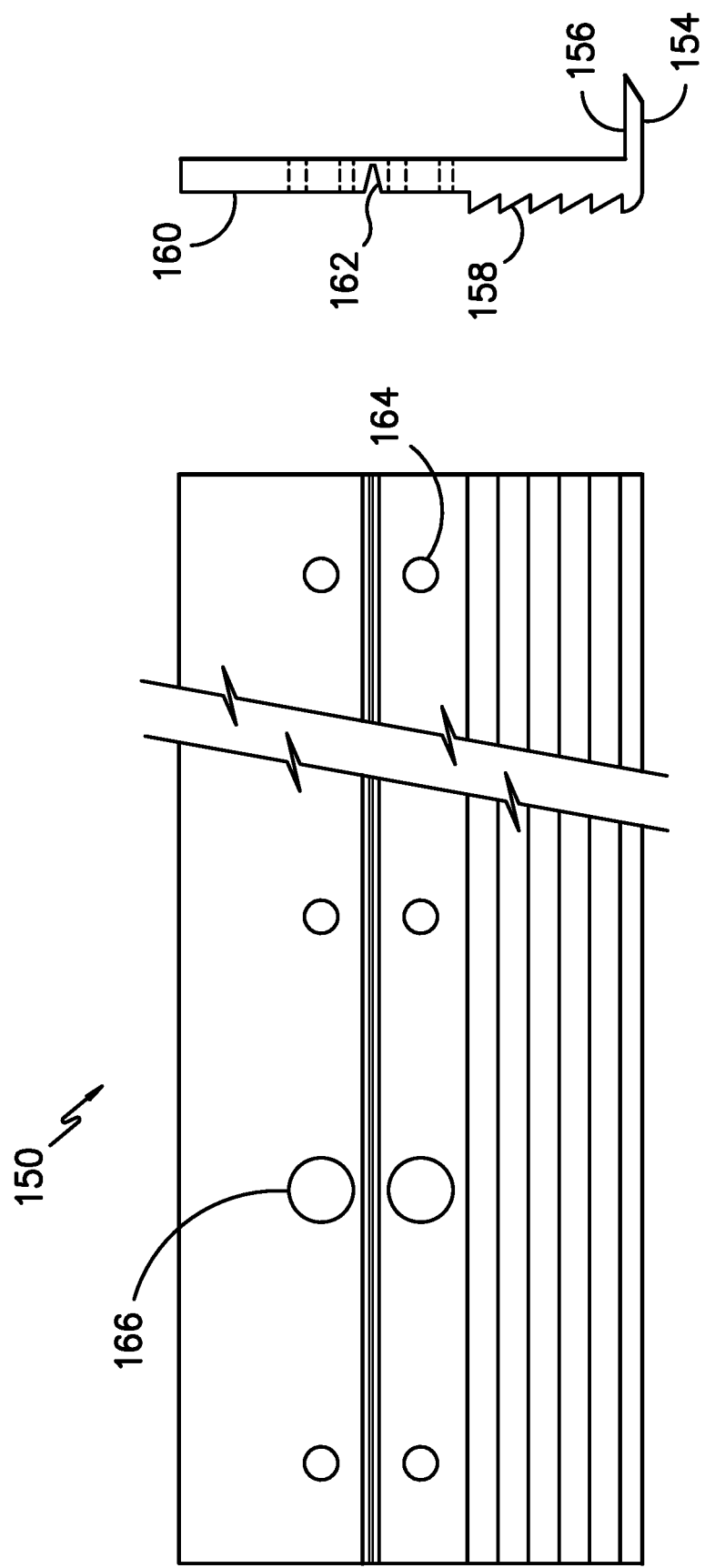
FIG. -1C-

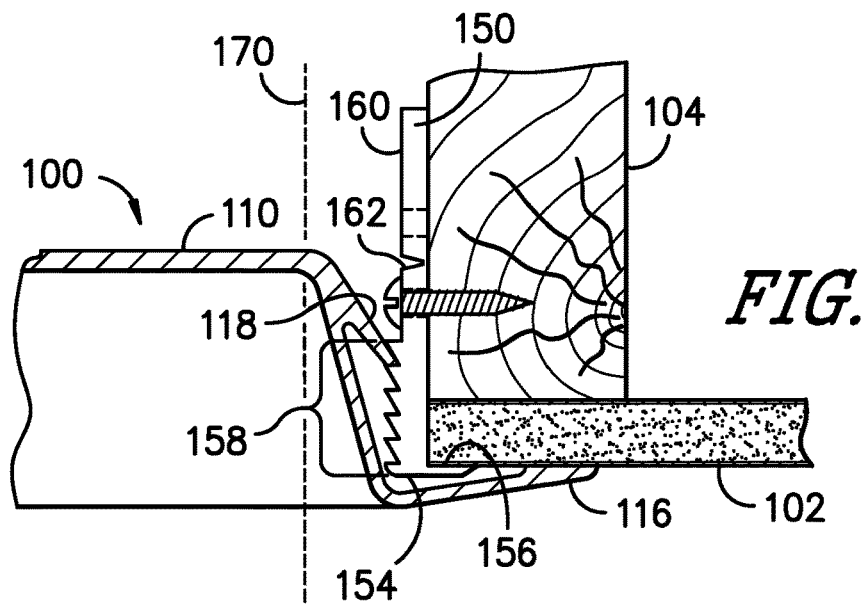
FIG. -1D-
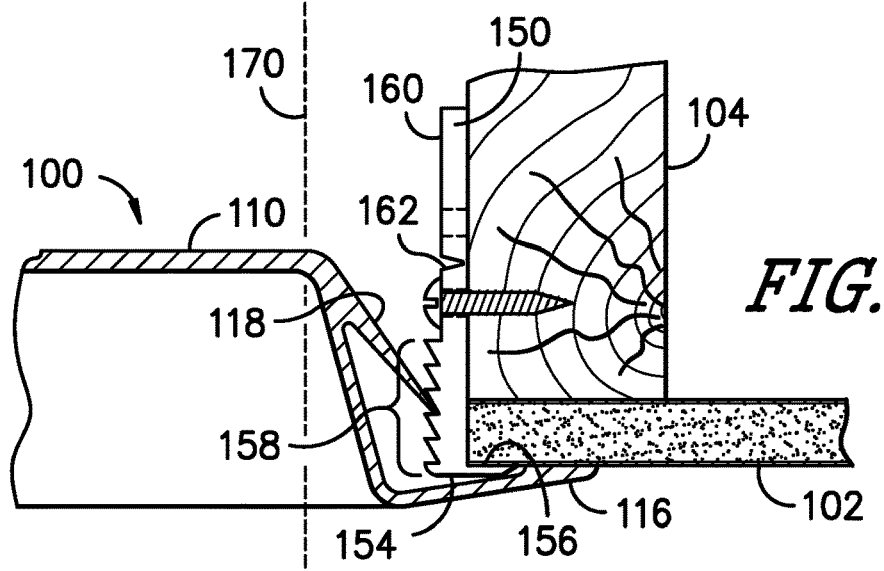
FIG. -1E-
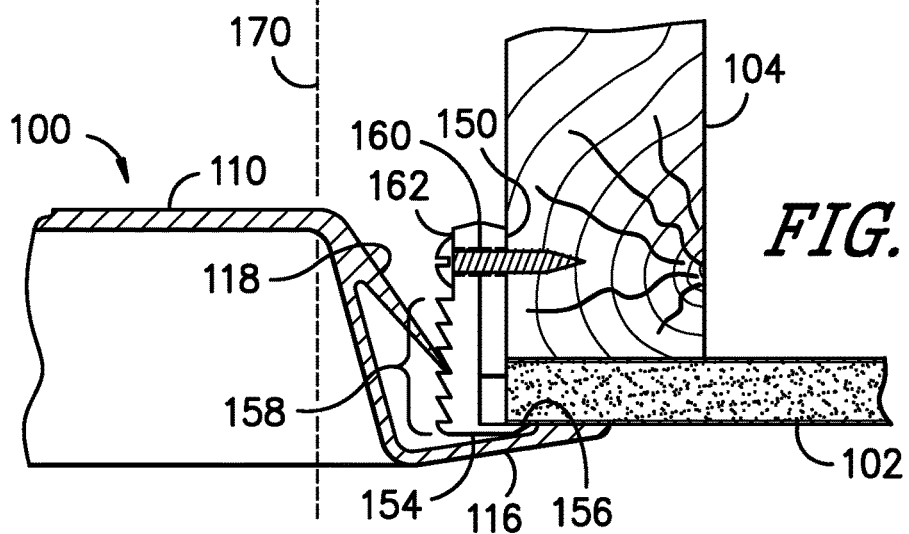
FIG. -1F-

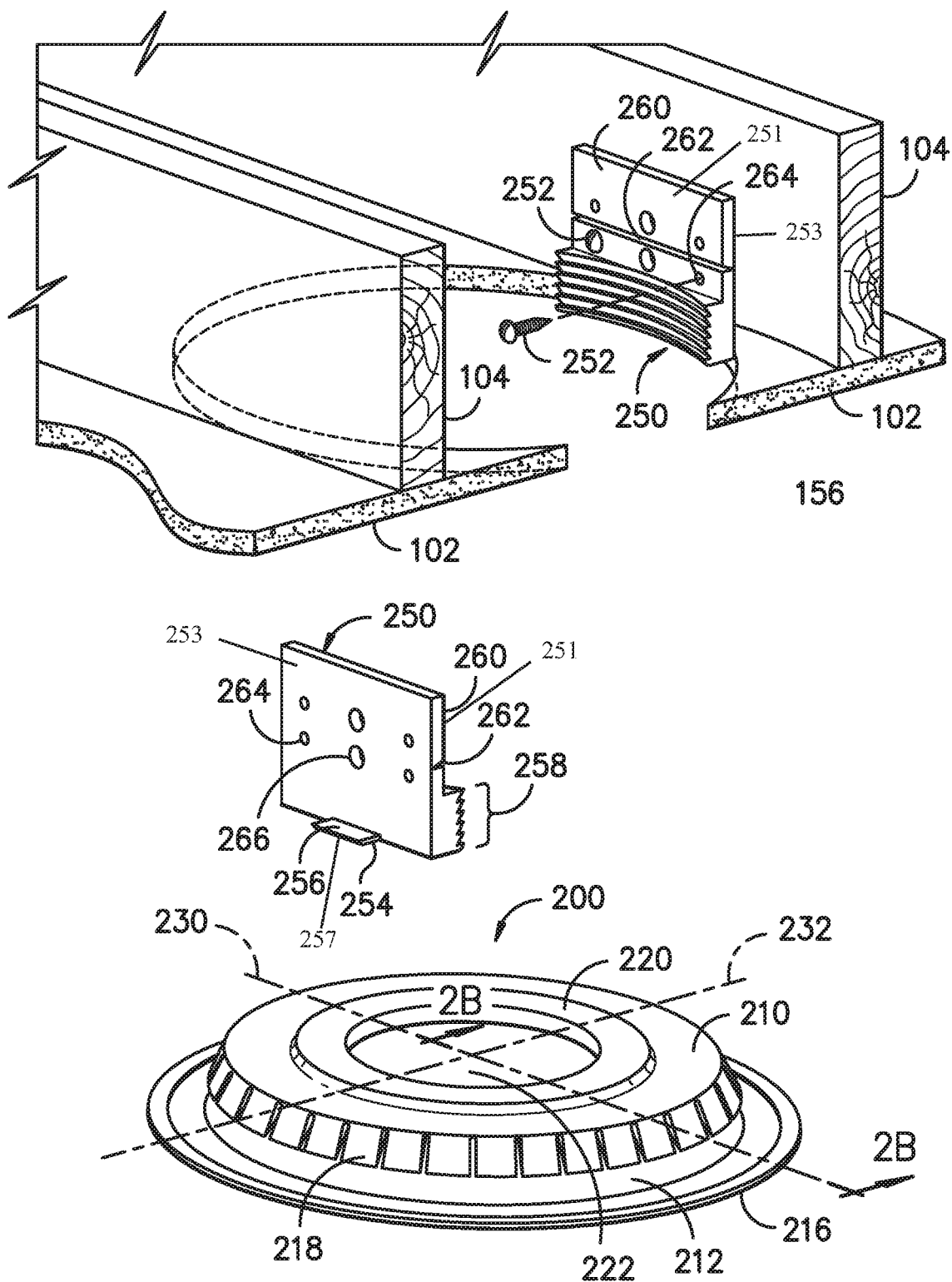
FIG. -2A-

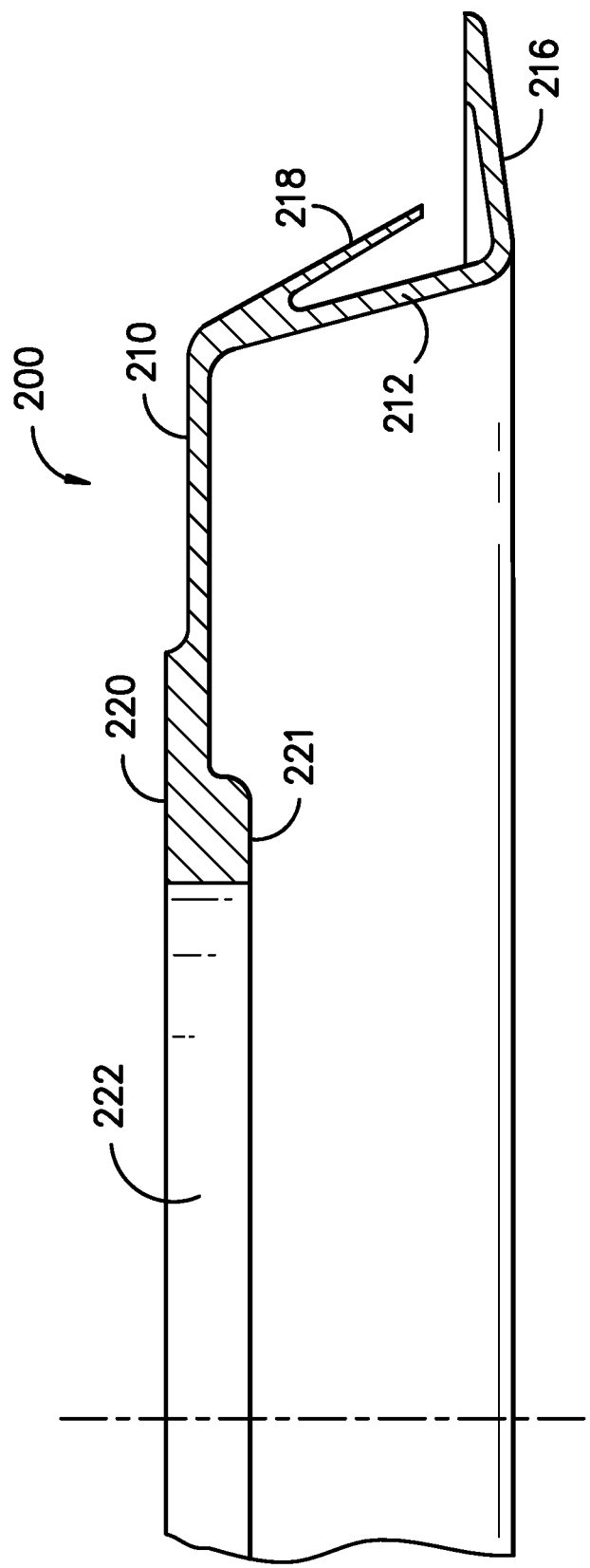
FIG. -2B-

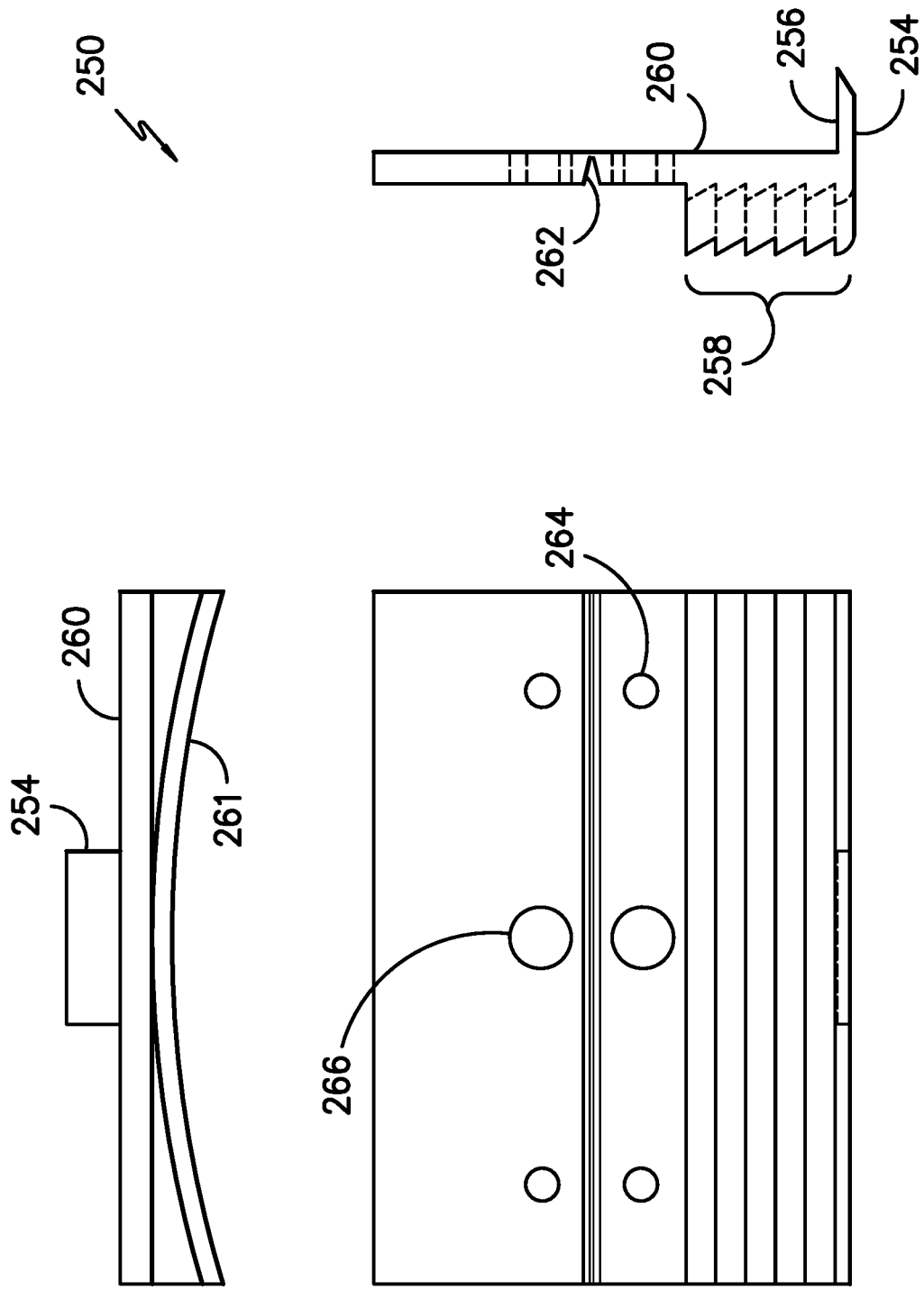
FIG. -2C-

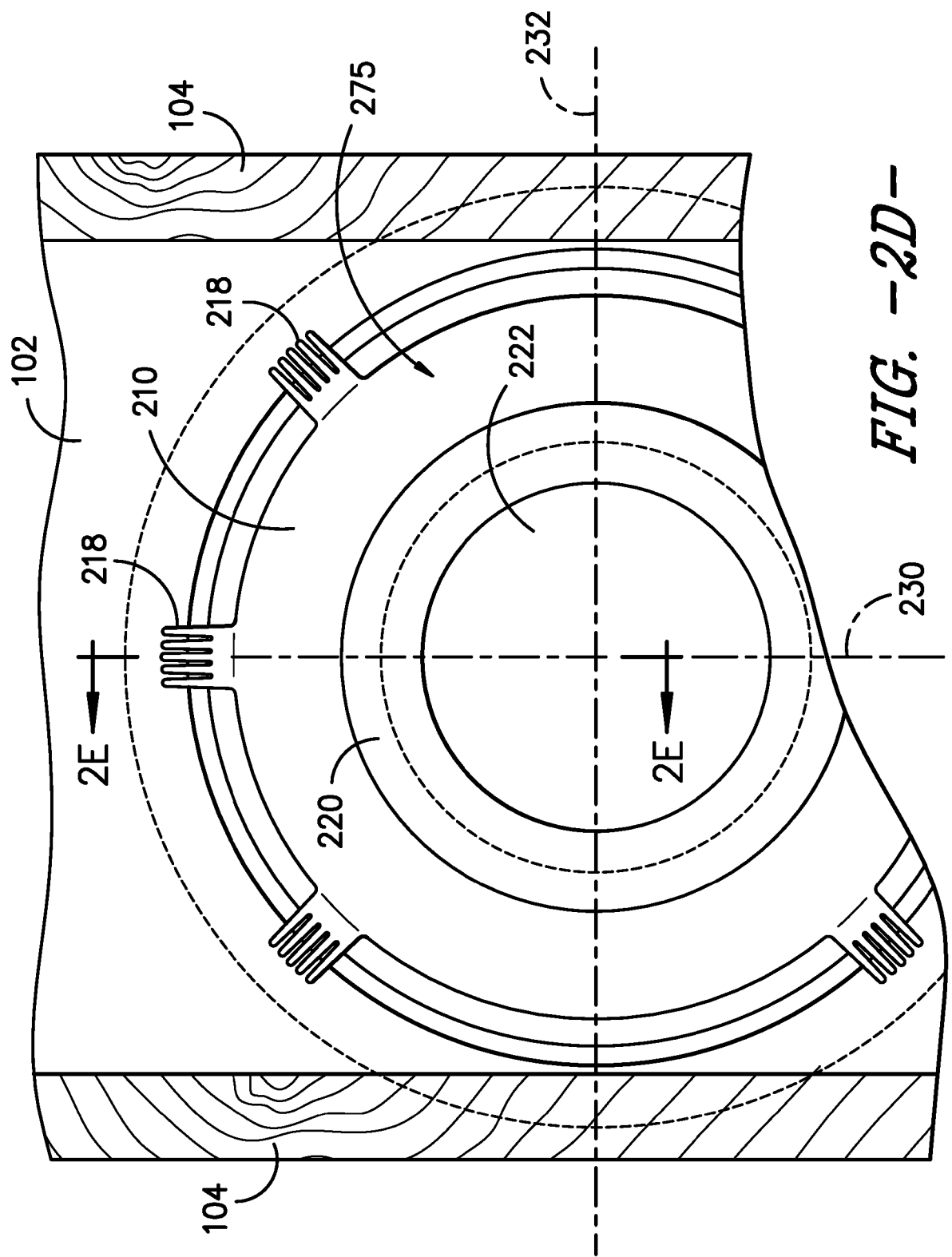
FIG. -2D-

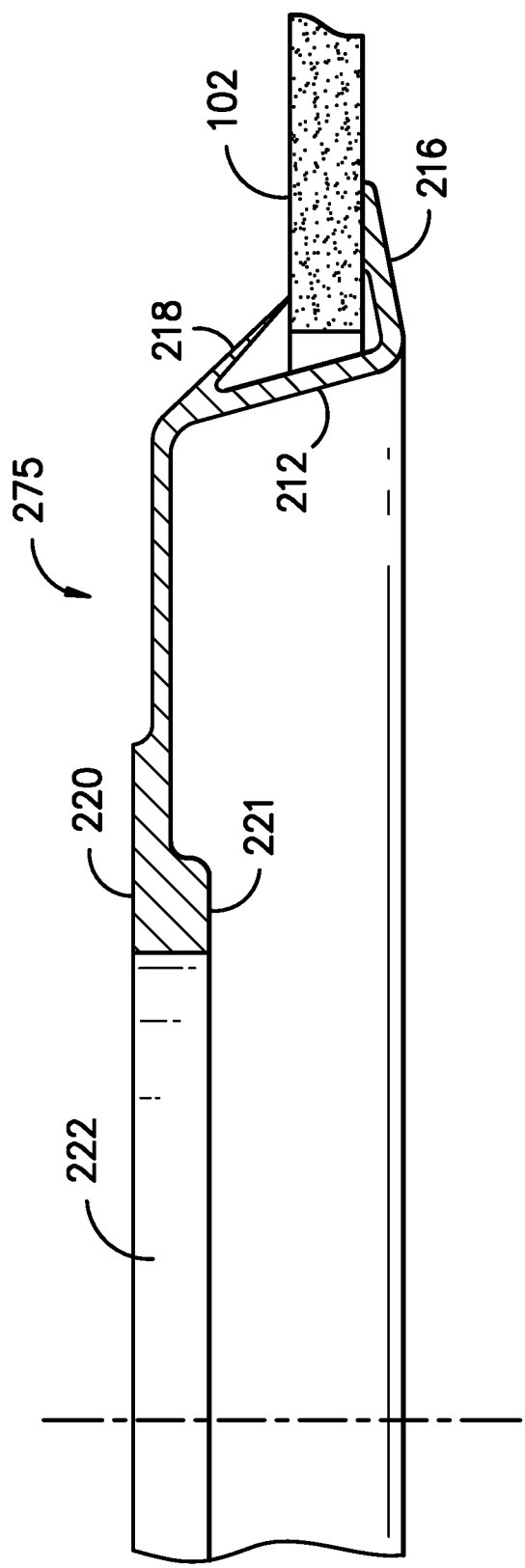
FIG. -2E-

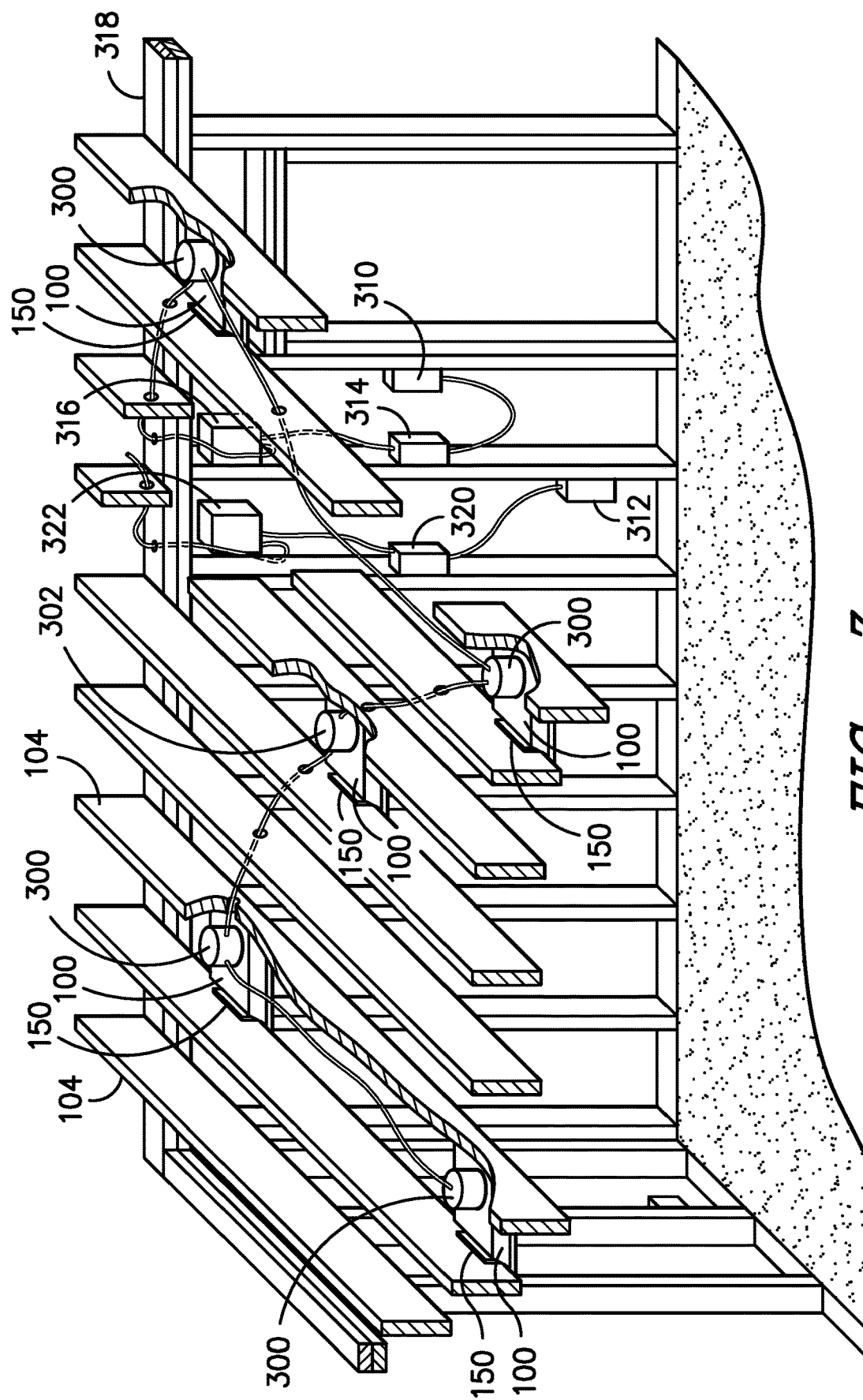
FIG. -3-

HOUSING APPARATUS FOR INSTALLATION OF CEILING OR WALL-MOUNTED ELECTRICAL APPLIANCES

BACKGROUND OF THE INVENTION

Adverse conditions such as fogged mirrors and a moist, humid atmosphere are almost certain to exist in bathrooms with no installed exhaust ventilation fan providing a means to create air changes in the room and thus remove the hot water vapor. However, these adverse conditions are often also experienced in bathrooms where exhaust ventilation fans are installed and operable. This moist atmosphere results in mold and mildew that is problematic in many bathrooms.

Frequently, many bathrooms with and without exhaust ventilation fans exhibit poor removal of hot water vapor. Wiping fogged-over mirrors and re-toweling multiple times is aggravating and time consuming, and the humid atmosphere inside the room can become antagonistic toward normal grooming activities such as grooming hair and applying cosmetics. These adverse circumstances are generally tolerated because there exists no simple, easy and inexpensive way to install an optimally located exhaust ventilation fan in an existing bathroom.

In the existing art, there are products that allow for the replacement of an inoperable or poorly operating exhaust ventilation fan. These replacement kits re-use the existing fan housing and are limited for use in replacing only the most common (and typically smallest) exhaust ventilation fans that are in wide spread use. Some products allow for the removal of an existing exhaust ventilation fan, whereby the electrical power source and the exhaust ventilation tubing that already exists remains in place and is re-purposed to support the new replacement fan.

U.S. Patent Publication No. 2015/0226443 to Zakula, et al., incorporated herein by reference, describes a ventilation apparatus including a housing assembly with at least one fluid inlet, and at least one fluid outlet, and an exhaust fan assembly coupled to the housing assembly within an inner region. The ventilation assembly can include a configurable mounting panel including a main panel and at least one tab, and at least one configurable flange coupled to the main panel and extending outwardly from the main panel. The configurable mounting panel can include at least one bending region with at least one aperture. The ventilation apparatus can also include a muffler including an aperture, an electrical box enclosure including a lid, and a duct connector assembly each coupled with the housing assembly.

There are several limitations to this apparatus described in the aforementioned patent publication to Zakula et al. When used as a replacement to an existing fan installation, the new fan is optimally located in the same space and location as the existing fan that is being replaced. This may or may not be an optimized location in the bathroom. Also, the access hole size required in the ceiling for the new fan is relatively small. And further, the embodiments described do not provide a recessed installation within the ceiling.

In some situations, there may be no existing exhaust ventilation fans in the bathroom. If there is attic space above the bathroom ceiling, the installation of a fan might be simplified as the hole created in the ceiling can be just large enough to accommodate the exhaust ventilation fan housing. If there is no attic space above, installing a fan in this situation would almost certainly require the creation of a hole in the ceiling large enough to provide both an electrical power supply and an exhaust ventilation duct for removal of the exhaust air stream to the exterior of the home. The hole created in the ceiling in this situation would likely need to be larger than the hole size needed to install the fan housing (i.e. a hole defined by the perimeter of the fan housing that is being installed).

In situations where a larger ceiling hole is required, repairing the ceiling around the newly installed fan would need to be undertaken across several days. It would require the use of drywall patching and therefore the use of drywall compound which involves nominally at least a 24 hour drying period before sanding. If the drywall joints and seams require a second application of drywall compound, at least another day would be required before the job is completed. The patched area may then be painted with primer, allowed to properly dry, and then the entire bathroom ceiling may be re-painted. In light of the foregoing, it would be advantageous to provide an apparatus or method of installation that can be completed quickly and efficiently.

With regard to bathroom exhaust ventilation fans, there are two other problem areas that need to be addressed. There currently exists a need for a simple means for relocating an existing exhaust ventilation fan to a more optimized location such as above and just outside of the shower area where the hot water vapor is being generated. Also, there exists a need for a simple means of recessing the installation of the exhaust ventilation fan above the surface level of the ceiling. The creation of a recessed area in the ceiling surface enhances the ability to more effectively capture and remove the hot water vapor.

While the problems surrounding the installation of an exhaust ventilation fan in an existing bathroom have been discussed thus far, the same installation issues and concerns are limiting the introduction of other electrically powered apparatuses inside existing rooms. The examples include but are not limited to apparatuses such as:

a) Ceiling fans of the type that are suspended into the room. Because of their weight and dynamic loading when rotating, these fans require secure support by positively affixing their mounting hardware into the existing structural support members of the room.

b) Recessed can lights in ceilings which provide a means for dimmable overhead lighting across the entire room. This type of lighting reduces, or can even eliminate the need for line-of-sight light sources such as torch lamps and table lamps. Line-of-sight light sources tend to be harsh and glaring for the room occupants, and typically illuminate only a small area within the room.

c) Sconce type lighting in the walls of a room as both a source of light and an architectural feature.

d) Safety illumination lighting such as those activated by motion sensors.

e) Audio speakers installed in ceilings, walls, and even floors where hard wired speaker systems are preferred.

f) Cameras, motion detectors and other such devices employed in the installation of security systems.

g) Other such types of apparatuses that provide for the upgrading and modernization of a home. i.e. home automation devices.

There exists a multitude of opportunities to enhance, improve, and modernize existing rooms using commonly available electrically powered apparatuses. It would be advantageous to provide a simple and economical means and method for providing and concealing the access space needed to supply utilities to the selected electrically powered apparatus. Furthermore, there exists an opportunity to provide work space access and a simple, clean, and cost effective way to aesthetically close off such access without a companion installation of an electrically powered apparatus.

U.S. Pat. No. 8,231,022 to Goldenne et al., incorporated herein by reference, describes an enclosure adapted to be recessed into a wall. The enclosure may include an access frame or base to which an access door or lid is hinged or otherwise movable. This reference provides a means of installing electrical control components in a recessed housing, but does not provide work space access.

Further to the above, there also exists the opportunity to utilize an improved means for the installation of a variety of recessed electrically powered apparatuses in new construction. U.S. Patent Publication No. 2010/0238670 to Moench, incorporated herein by reference, describes an enclosure for use in conjunction with a recessed ceiling fixture is provided which includes a housing constructed from a single piece of fire-resistant gypsum wallboard. The recessed fixture is mounted to the interior of the support flange after installation of the housing between the building joists. However, the approach taken to achieve compliance with the building standards introduces additional components that must be installed prior to the completion of the ceiling installation, and these components provide no means for the mounting of the various electrically powered apparatuses being installed.

BRIEF SUMMARY OF THE INVENTION

In a preferred embodiment, the present invention is a preferably prefabricated and generally rigid recessed housing that may be inserted into a ceiling, wall, or floor to facilitate installation of various electrically powered apparatuses such as ceiling fans, exhaust fans, lighting fixtures, speakers, etc. The housing may be designed in various shapes, such as rectangular, cylindrical, elliptical or any other desired geometric shape. The generalized construction of the various embodiments of the recessed housing comprises a top surface, side walls that preferably fully enclose both within themselves and the top surface of the various geometries, and a bottom that is open but that may feature a full perimeter close out lip that extends beyond the side walls. Preferred materials of construction for the recessed housing may include, but are not be limited to, thermoplastic or metallic materials. The preferred method of prefabrication may include, but not be limited to, thermoplastic injection molding or metal stamping processes. An additional aspect of a metal stamping process might include weldments, mechanical mating surfaces, mechanical fasteners or any other suitable means of attaching features to a stamped metallic housing.

In one aspect of the present invention is a securing flange. Preferred materials of construction for the securing flange may include, but not be limited to, rigid or elastomeric thermoplastics or thermoset elastomers or metallic materials. A preferred method of prefabrication may include, but not be limited to, profile extrusions cut to length, or injection molding in the case of thermoplastics or thermosets, or stamping in the case of metals.

Another aspect of the present invention is that various embodiments of the recessed housing may be designed to cover and conceal openings created in ceilings, walls, and floors, such openings extending between the structural support members of the room with the openings being of sufficient size to provide a person the work space needed to accomplish the installation of various electrically powered apparatuses from inside the room.

Yet another aspect of the present invention provides a method whereby the various embodiments of the recessed housing are installed within the opening created in the ceiling, wall, or floor, and the recessed housing is secured in place preferably flush with the ceiling, wall or floor surface by engagement with a plurality of securing flanges of various embodiments to produce a concealed fastener installation of the housing.

An additional aspect of the method is the ability to compensate for minor variations in the spacing of the structural support members of the room. While the concealed fastener approach is a preferred embodiment, an additional aspect of the disclosure is the alternative use of mechanical fasteners through the body of the recessed housing into the structural support members. Such mechanical fasteners may or may not be concealed as pertains to the final appearance of the installation.

In yet another aspect of the present invention is that the various embodiments of the recessed housing may provide a full perimeter close out lip that provides a means to cover and aesthetically conceal the access opening created in the ceiling, wall, or floor—without the need for drywall repairs or patching, repainting, and the like. This design aspect is a contributing factor in terms of time and cost reduction for the execution of a project.

An additional aspect of the present invention is that the various embodiments of the recessed housing provide the apertures needed to enable the functionality of the various electrically powered apparatuses that are affixed to the recessed housing. A further aspect is the provision for integral inclusion of the surfaces and members in the recessed housing that are needed to affix the electrically powered apparatuses to the recessed housing in a proper spatial relationship to the apertures.

An additional aspect of the present invention is the manufacture of prefabricated recessed housings of various embodiments, including embodiments that are devoid of apertures and thus provide the means to simply create and conceal a work space opening between the structural support members of a room without the companion installation of an electrically powered apparatus (access to a work space for the sake of access). This concept may be expanded to include recessed housings that have apertures, such apertures also being fitted with a snap in/snap out cover plate to cover and conceal the aperture.

Combining the various electrically powered apparatuses with the various embodiments of the prefabricated recessed housing provides additional advantages that include: the creation of a work space large enough for a person to install, from inside the room, a variety of electrically powered apparatuses; the ability to install an exhaust ventilation fan in an optimized location in a bathroom, i.e. near where the hot water vapor is being generated; the recessed nature of the prefabricated housing embodiments inherently leverages the physics principle that hot air rises, and thus enhances the effectiveness of capture of the hot water vapor by an exhaust ventilation fan installed in a bathroom; a volume of space is created above the ceiling surface for the collection and capture of the hot water vapor; the ability to install suspended-in-ceiling room ceiling fans in a safe and secure manner; the ability to install a variety of lighting systems such as recessed can lights, suspended-in-ceiling chandeliers, sconce lights, motion activated safety lights, etc., as a means of improving overall illumination, architectural effect, or occupant experience; the ability to install audio speakers, cameras, motion detectors and other such devices commonly employed in the installation of security systems, and a wide variety of other electronic and home automation devices.

An additional embodiment of the present invention may provide the ability to satisfy the building code requirements directed toward the establishment of a compliant fire-rated barrier system in ceilings. These fire rated barrier systems are required in multi-story, multi-dwelling commercial living spaces such as hotel rooms, apartments, nursing homes, etc. This embodiment may provide the manufacture of a prefabricated recessed housing using either flame retardant thermoplastic or stamped metal. The recessed housing may then be impregnated with a compliant fire resistant material, preferably on the non-exposed surfaces of the top and sides of the recessed housing, resulting in a barrier system that is compliant with currently established building standards. One advantage of this embodiment is the ability for installation to occur after the ceiling construction in the room is completed. In addition, this embodiment may potentially eliminate the time consuming and expensive field fabrication of current typical barrier systems.

While this disclosure has discussed the execution of projects in existing rooms and buildings by creating the space needed to accomplish the work, and then simply and aesthetically covering and concealing the work space, it should be noted that the present invention and its various embodiments may also be adapted to and utilized in new construction as well.

DESCRIPTION OF THE DRAWINGS

These and other features, aspects, and advantages of the present invention will become better understood with regard to the following description, appended claims, and accompanying drawings where:

FIG. 1A is an exploded view of one embodiment of the present invention, illustrating how a rectangular embodiment can be installed within the cavity that exists between structural support members of a room;

FIG. 1B illustrates a cross-sectional partial side view of an exemplary rectangular embodiment of the housing of the present invention;

FIG. 1C is a partial front view and side view of one embodiment of the securing flange for a rectangular embodiment of the present invention, illustrating the functional details thereof;

FIG. 1D is a cross-sectional partial side view illustrating one installation scenario of the present invention, whereby one embodiment of the bendable securing fin has been shortened to accommodate narrower spacing of a structural support member;

FIG. 1E is a cross-sectional partial side view illustrating another installation scenario of the present invention whereby the spacing of a structural support member is at or near nominal;

FIG. 1F is a cross-sectional partial side view illustrating yet another installation scenario of the present invention, whereby one embodiment of the securing flange is folded over on itself to accommodate wider spacing of a structural support member;

FIG. 2A is an exploded view of one embodiment of the present invention, illustrating how a cylindrical embodiment can be installed within the cavity that exists between structural support members of a room;

FIG. 2B illustrates a cross-sectional partial side view of an exemplary cylindrical embodiment of the housing of the present invention;

FIG. 2C is a partial front view and side view of one embodiment of the securing flange for a cylindrical embodiment of the present invention, illustrating the functional details thereof;

FIG. 2D is a partial top view illustrating one embodiment of the present invention that may be used for the installation of light weight and/or light load appliances;

FIG. 2E is a cross-sectional partial side view of FIG. 2D, demonstrating how a plurality of bendable securing fins might engage the top or hidden surface of a ceiling or wall; and FIG. 3 illustrates one scenario of installation whereby an installer can provide electrical power to multiple locations within the ceiling of a room.

DETAILED DESCRIPTION OF THE INVENTION

Turning now to the drawings, and with specific reference to FIG. 1A and FIG. 1B, one embodiment of an architectural recessed housing constructed in accordance with the present invention is generally referred to by reference numeral 100. As shown therein, the housing 100 is preferably adapted to be recessed into a ceiling, wall, or floor of a home or building so as to be generally flush with the ceiling, wall, or floor surface 102. The housing 100 is preferably adapted to be recessed into a cavity created between the existing structural support members of the room 104.

In a preferred embodiment described herein, the housing 100 may be rectangular shaped, although it is to be understood that the housing may be any desired geometric shape. In the exemplary rectangular shape, the housing 100 preferably comprises a housing top 110 and opposed housing sides 112 and 114, whereby the top 110 and sides 112, 114 are preferably seamlessly affixed to one another or molded as a single piece. Extending outside of the housing sides 112, 114 and generally parallel to the housing top 110 may be a full perimeter close out lip 116. The full perimeter close out lip 116 is also preferably seamlessly attached or affixed to the bottom of housing sides 112, 114.

Extending from the intersection of the housing top 110 and the housing sides 112, 114 at a predetermined angle and of a predetermined length are a plurality of bendable securing fins 118, as shown best in FIG. 1B. The bendable securing fins 118 of the rectangular embodiment may be manufactured as an integral aspect of the housing 100 in the case of manufacture via conventional thermoplastic injection molding processes. In the case of metal stamping as a means of manufacture, the bendable securing fins 118 may be incorporated as an additional aspect of the housing top 100 or of the housing sides 112, 114. The housing 100 may further include a housing securing member 120 extending from the top of said housing, this securing member being used to secure an electrical apparatus to the housing, when necessary. An alternative aspect of manufacture via metal stamping may be the attachment of either or both the bendable securing fins 118 and the housing securing member 120 via weldment, mechanically mating surfaces, mechanical fasteners, or any other suitable securing method. In most situations, the preferred embodiment for the housing 100 may be manufactured using rigid thermoplastic materials via conventional thermoplastic injection molding processes.

In the embodiment shown in FIG. 1A, the housing 100 may have an opening 122 in the housing top 110 as a means to enable the functionality of the affixed electrically powered apparatus such as a fan or lighting fixture (not shown). In an alternative embodiment, the housing top 110 may be comprised of a solid, continuous surface without the aforementioned opening 122. It is contemplated that the electrically powered apparatus is aligned with the housing top 110 and may be held in place by means of mechanical fasteners that may be installed through pre-drilled pilot holes into a housing securing member 120 in such a way as to affix the electrically powered apparatus to the housing top 110 in the correct spatial relationship to the opening 122, for example along the y-axis 130 in FIG. 1A. Further, the housing securing member 120 may be disposed in a predetermined position on the housing top 110 such that the electrically powered apparatus is affixed to the housing 100 in the correct spatial relationship to the opening 122, for example along the x-axis 132.

The housing 100 is preferably dimensioned such that the housing 100 can be installed between structural support members. For example, the length of the two shorter housing sides 112 may be dimensioned such that the housing 100 may be installed between support members that at are nominally spaced 16 inches on center (OC). In another example, the length of the two longer sides 114 may be dimensioned such that the housing 100 can be installed between structural support members that are nominally spaced 24 inches OC. It is to be understood that the sides of the housing, such as sides 112, 114, may be any length desired or necessary to fit within a specific space.

In a preferred embodiment, the housing 100 may also utilize a securing flange 150 that may be affixed to the structural support member 104 by means of a plurality of mechanical fasteners 152. Referring to FIGS. 1A and 1C, additional aspects of securing flange 150 are illustrated. The securing flange 150 may be manufactured as a profile extrusion cut to length and constructed of thermoplastic, thermoset, or metallic materials. Alternatively, the securing flange 150 may be manufactured using thermoplastic or thermoset injection molding processes or a stamped metal process. In one embodiment, the securing flange 150 may be generally L-shaped with a face 160 and an angled foot 154, preferably extending out generally at a right angle at the bottom of the securing flange 150. When installed, the upper surface 156 of the angled foot 154 preferably sits flush with the ceiling, wall, or floor surface 102 as a means of correctly positioning the securing flange 150 for attachment to structural support members 104 using a plurality of mechanical fasteners 152. The securing flange 150 may also include of a plurality of engagement teeth 158 across the length of the securing flange face 160. The spatial relationship between the top surface 156 of angled foot 154 and the plurality of engagement teeth 158 is predetermined as a means to achieve flush to the ceiling, wall, or floor surface 102 of the full perimeter close out lip 116 of the housing 100. The flush installation is achieved via the engagement of the tip of the bendable securing fin 118 when it is urged past the engagement teeth 158 of securing flange 150.

An additional aspect of one embodiment of a securing flange 150 is the inclusion of a living hinge 162 in the securing flange face 160, as shown best in FIG. 1C. The securing flange face 160 also preferably includes a plurality of apertures 164 and 166. Apertures 164 may be included as a means of affixing the securing flange 150 to the structural support members 104 using mechanical fasteners 152. Apertures 166 may be used for the pass through of the wiring needed to provide electrical power to the selected electrically powered apparatus.

FIG. 1D, FIG. 1E, and FIG. 1F illustrate the use of the present invention in different installation scenarios likely to occur, illustrating a variation in the relative position of the structural support members 104.

FIG. 1D illustrates a scenario wherein the spacing of the structural support member 104 is narrower than nominal. In this scenario, the length of the bendable securing fin 118 has been shortened by the installer. The shortened bendable securing fin 118 may have its tip engaged with a higher engagement tooth 158 of securing flange 150. If the spacing variation of the structural support members 104 is only slightly narrower than nominal, the field shortening of the bendable securing fin 118 may be done on just one side of the housing 100. For even narrower spacing of the structural support members 104, the field shortening of the bendable securing fin 118 may be done on both sides of the housing 100.

FIG. 1E illustrates a scenario wherein the spacing of the structural support member 104 is at or near nominal. In this scenario, the secure installation of the housing 100 may be completed with no modifications to either the bendable securing fin 118 or to the securing flange 150. Installation may be completed without any additional adjustment.

FIG. 1F illustrates a scenario wherein the spacing of the structural support member 104 is wider than nominal. In this scenario, the securing flange 150 may be folded over onto itself by means of the living hinge 162. This adjustment results in the movement of the securing flange face 160 to a position of engagement with the bendable securing fin 118 when it is urged past the engagement teeth 158 of the securing flange 150. If the spacing variation of the structural support members 104 is only slightly wider than nominal, the folding over at the living hinge 162 may only need to be done on one side of the installation. For larger width variation in structural support member 104 spacing, the folding over at the living hinge 162 may be done on both sides of the installation.

While the present invention includes design features that can accommodate for minor variations of spacing of the structural support members 104, a skilled artisan can adjust for more radical spacing variations if needed. For situations wherein the spacing of the structural support members 104 is tighter than the adjustments can accommodate, a skilled artisan may use a hand held circular saw to plunge cut a notch into the structural support member, such notch being large enough to accommodate the installation of the securing flange 150. For situations wherein the spacing of the structural support members 104 is wider than the adjustments can accommodate, a skilled artisan can field fabricate shim spacers installed between the securing flange 150 and the structural support member 104, noting that longer mechanical fasteners 152 may be needed.

FIG. 2A and FIG. 2B illustrate another embodiment of the architectural recessed housing of the present invention showing a cylindrically shaped embodiment 200 constructed in accordance with the teachings of the present disclosure. The adaptive use of the cylindrical housing 200 is similar to that of the rectangular embodiment previously described above, thus allowing for an abbreviated discussion of the cylindrical embodiment. The cylindrical embodiment specifically may be similar in manufacture method, materials of composition, and design function and purpose. It is to be noted that the methods described for accommodating minor variations in the spacing of structural support members 104 for the rectangular embodiment (and illustrated in FIGS. 1D, 1E, and 1F) are equivalently applicable for the cylindrical embodiment.

The cylindrical housing 200 preferably comprises a housing top 210, a housing side or circumference 212, perimeter close out lip 216, and bendable securing fins 218. The previous discussion regarding the inclusion or exclusion of an opening 222 in the housing top 210 also applies to the cylindrical embodiment. Note that the referenced aspects are denoted with a 1XX numerical reference for the exemplary rectangular embodiment and with a 2XX numerical reference for the exemplary cylindrical embodiment.

With respect to the attachment of the electrically powered apparatus to the housing 100, a securing member 120 is illustrated in FIG. 1A. With respect to the attachment of the electrically powered apparatus to the housing 200 a top securing surface 220 and a bottom securing surface 221 are illustrated in FIG. 2B. Both the rectangular embodiment and the cylindrical embodiment may have either a securing member or a securing surface, or both embodiments might have both a securing member and a securing surface. The choice of style of mounting accommodation (securing member or securing surface or both) included in the design of the embodiment may be selected according to the electrically powered apparatus that is to be affixed to the housing.

Referring now to FIG. 2C, the detailed aspects of the securing flange 250 are illustrated. Preferred methods of manufacturing include injection molding (thermoplastic or thermoset elastomer) and metal stamping. The material composition and the design functionality discussed for the securing flange 150 of the rectangular embodiment may be applied to securing flange 250 of the cylindrical embodiment as well.

The securing flange 250 may include a right angle foot 254 having a top surface 256; a plurality of engagement teeth 258; a securing flange face 260; and a living hinge 262. In a preferred embodiment, the right angle foot 254, the top surface 256 of the right angle foot 254, and the living hinge 262 may be flat or planer in nature; while the engagement teeth 258 and the securing flange face 261 may be rounded or curved in nature due to their function of engaging the circular bendable securing fins 218 on the cylindrical housing 200.

FIG. 2D and FIG. 2E illustrate another embodiment of the architectural recessed housing of the present invention showing a cylindrically shaped embodiment 275 constructed in accordance with the teachings of the present disclosure (y-axis denoted 230 and the x-axis denoted 232). The adaptive use of the cylindrical housing 275 is similar to that of cylindrical embodiment previously described above. Thus, the features and components for cylindrical housing 200 directly apply to cylindrical housing 275.

Cylindrical housing embodiment 275 is intended to address situations that may occur, whereby the electrically powered apparatus to be installed is very light weight, with little to no dynamic loading. Low voltage recessed LED light fixtures are a good example of such an electrically powered apparatus. As best illustrated in FIG. 2E, in this light weight, light load situation the bendable securing fin 218 may engage the interior hidden surface of the ceiling, wall or floor surface 102, rather than engaging with the teeth 258 of a securing flange 250. Note that this manner of engagement of the bendable securing fin (118 or 218) to the interior surface of the ceiling, wall or floor 102 may be utilized and applied to rectangular or other geometrically shaped embodiments.

Other geometric embodiments can be adapted to bring the same functionality as described herein, each offering alternative architectural appearance. While these alternative geometric embodiments will not be depicted or described in this disclosure, the use of an alternative geometric configuration such as elliptical, hexagonal, octagonal, or other geometric shape is inherently and specifically incorporated in this disclosure.

It is to be understood that this disclosure further includes the manufacture of the present invention and its embodiments using fire retardant thermoplastics and/or stamped metals, either of which may or may not be impregnated with flame retardant materials or coatings on the non-visible housing top (110 and/or 210) and non-visible sides (112 and 114 and/or 212) for the purpose of complying with building standards that specify the requirements for fire-rated barrier systems in ceilings.

With regard to the installation, pre-project planning and layout of the present invention is important in achieving a professional appearing installation. Minimally invasive means can be used to assess the spacing of the structural support members and their relative location within the room. The depth of the cavity created between the structural support members can also be assessed to ensure that the stack height of the intended electrically powered apparatus combined with the height of the housing will fit inside the available cavity. The pre-project planning may take into account the sourcing of the electrical power and, in the case of an exhaust ventilation fan, a means of discharging the air flow to the exterior. Finally, the pre-project planning may take into account the fact that the installed apparatus may be centered within the structural support members and not necessarily centered in the room.

Further, the use of the present invention may be relatively straightforward in situations where the electrical power sourcing already exists. The use is similarly straightforward in situations where the installation is in a ceiling and accessible attic space is above the ceiling. However, in situations where the project is to install an electrical apparatus in a ceiling, and a source of electrical power is not already present in the ceiling, and there is a floor (not an accessible attic) above the ceiling, the project is more complicated. A method to address this situation is illustrated in FIG. 3.

Turning now to FIG. 3, an architectural installation of four perimeter recessed lights 300 plus an additional center recessed light 302 is depicted. The required electrical power sourcing may be provided by connecting to the line side of an existing electrical wall switch 310. An alternative approach (also illustrated in FIG. 3) would be to source the electrical power by connecting to the line side of an existing receptacle 312. Gang boxes 320 and 322 would provide a similar utility as gang boxes 314 and 316 (described below) respectively.

The installer, working in the same wall cavity as the location of the existing wall switch 310, may make two room side openings in the wall. One of the openings may be at the same height as the existing wall switch 310 and preferably sized to accommodate an old work gang box—either single or duplex. Another opening may be close to the ceiling and preferably sized to accommodate a duplex old work gang box. The opening near the ceiling may be used to drill a hole through the double 2×4 header that is typically standard construction for a wall. The wiring may be installed from the existing wall switch 310 to the new light switch 314, through the duplex gang box 316 near the ceiling and on through the holes in the double 2×4 header 318. The duplex gang box 316 may be fitted with a blank duplex cover (not shown) once the installation is complete.

Using the relatively large holes created for the installation of the perimeter recessed lights 300 and the relatively large hole created for the installation of the center recessed light 302, a means is created to drill holes through the ceiling structural support members 104 as needed to fish and pull the wiring from the source location above the double 2×4 header 318 through the holes drilled into the ceiling structural support members 104 and into all of the locations where electrical apparatuses are to be installed.

It is contemplated that center recessed light 302 can easily be replaced by a suspended-in-room ceiling fan, such ceiling fan being properly supported by a known art mounting system that is anchored securely into the ceiling structural support members 104. Alternatively, the center recessed light 302 can be replaced by a decorative chandelier, such chandelier also fully supported by a known art secure mounting system.

Although the present invention has been described in considerable detail with reference to certain preferred versions thereof, other versions are possible. Therefore, the spirit and scope of the appended claims should not be limited to the description of the preferred versions contained herein. All features disclosed in this specification may be replaced by alternative features serving the same, equivalent or similar purpose, unless expressly stated otherwise. Thus, unless expressly stated otherwise, each feature disclosed is one example only of a generic series of equivalent or similar features.

What is claimed is:

1. An apparatus for facilitating the installation of an electrically powered appliance comprising:
    a housing having a top and a plurality of sides extending downwardly at an angle away from a bottom surface of said top; the distal edges of said sides being flared outward at an angle away from said housing, thereby forming a lip that extends about a perimeter of said housing;
    a plurality of bendable securing fins disposed about and affixed to the perimeter of said housing, said securing fins extending downwardly from the intersection of said top and said sides, thereby forming an acute angle between an outer surface of said sides and an inner surface of said securing fins;
    and
    at least one securing flange with an inner face and an outer face, said inner face of said securing flange having a first section and a second section, said first section including a plurality of engagement teeth in parallel relation to one another for engaging a tip of said securing fins; and said securing flange having an angled foot portion with a top surface and a bottom surface;
    whereby said angled foot portion extends at a generally right degree angle from a lower portion of said securing flange; and whereby said outer face of said securing flange buts against a vertical mounting surface, and said top surface of said angled foot portion buts against a horizontal mounting surface during installation.

2. The apparatus set forth in claim 1, wherein said housing is a geometric shape selected from the group consisting of rectangle, square, triangle, pentagon, hexagon, and octagon.

3. The apparatus set forth in claim 1, wherein said securing flange further includes a living hinge dividing said first section and said second section of said inner face of said securing flange, whereby said securing flange may be folded along said living hinge to accommodate different spacing measurements during installation.

4. The apparatus set forth in claim 1, wherein said securing flange further includes a plurality of apertures for receiving mechanical fasteners and electrical wires.

5. The apparatus set forth in claim 1, further including at least one housing securing member affixed to at least a portion of an upper surface of said housing for securing an electrically powered apparatus to said housing.

6. A method of installing an electrically powered apparatus on a mounting surface comprising the steps of: providing a housing having a top, side, and an open bottom; said housing including a plurality of bendable securing fins disposed about a perimeter of said housing; providing at least one securing flange having an inner face and an outer face, said inner face including living hinge and a plurality of engagement teeth for engaging a tip of said securing fins; forming a cavity in a mounting surface between existing structural support members; affixing said securing flange to said structural support members such that said outer face of said securing flange is flush with said mounting surface and said engagement teeth on said inner face of said securing flange are exposed to said cavity; inserting said housing into said cavity and adjacent to said securing flange; engaging said bendable securing fins with said engagement teeth, thereby securing said housing within said securing flange; and affixing an electrically powered apparatus to said housing.

7. The method set forth in claim 6, further including the step of shortening the length of bendable securing fins of said housing, thereby accommodating actual spacing between said support members.

8. The method set forth in claim 6, further including the step of folding said securing flange via said living hinge prior to affixing said securing flange to said structural support member, thereby accommodating actual spacing between said support members.

* * * * *